United States Patent
Turk

(10) Patent No.: US 8,870,235 B2
(45) Date of Patent: Oct. 28, 2014

(54) PIPE FITTING

(75) Inventor: Marc Timothy Turk, Kwa Zulu Natal (ZA)

(73) Assignee: Cliquot Holdings (Pty) Ltd., Umhlanga (ZA)

( * ) Notice: Subject to any disclaimer, the term of this patent is extended or adjusted under 35 U.S.C. 154(b) by 0 days.

(21) Appl. No.: 13/810,142

(22) PCT Filed: Apr. 7, 2011

(86) PCT No.: PCT/ZA2011/000020
§ 371 (c)(1),
(2), (4) Date: Mar. 19, 2013

(87) PCT Pub. No.: WO2012/009731
PCT Pub. Date: Jan. 19, 2012

(65) Prior Publication Data
US 2013/0168959 A1    Jul. 4, 2013

(30) Foreign Application Priority Data
Jul. 13, 2010   (ZA) .................................. 2010/04923

(51) Int. Cl.
*F16L 19/06* (2006.01)
*F16L 19/065* (2006.01)

(52) U.S. Cl.
CPC ............. *F16L 19/065* (2013.01); *F16L 19/061* (2013.01)
USPC ............................. 285/342; 285/343; 285/249

(58) Field of Classification Search
USPC ............................ 285/342, 343, 340, 339, 249
See application file for complete search history.

(56) References Cited

U.S. PATENT DOCUMENTS

| | | | | |
|---|---|---|---|---|
| 695,071 A | * | 3/1902 | Mooney | 285/343 |
| 870,428 A | * | 11/1907 | Graham | 285/342 |
| 1,044,335 A | * | 11/1912 | Ball | 285/343 |
| 2,452,277 A | * | 10/1948 | Woodling | 285/343 |
| 2,452,278 A | * | 10/1948 | Woodling | 285/343 |
| 2,503,169 A | * | 4/1950 | Phillips | 285/343 |
| 2,585,453 A | * | 2/1952 | Gallagher et al. | 285/341 |
| 2,644,700 A | * | 7/1953 | Woodling | 285/343 |
| 2,779,610 A | * | 1/1957 | Risley | 285/343 |
| 3,135,520 A | * | 6/1964 | Borah | 285/342 |
| 3,248,135 A | * | 4/1966 | Meripol | 285/343 |
| 3,265,412 A | * | 8/1966 | Reid et al. | 285/342 |
| 3,567,843 A | * | 3/1971 | Collins et al. | 285/341 |
| 4,138,145 A | * | 2/1979 | Lawrence | 285/343 |
| 4,309,050 A | * | 1/1982 | Legris | 285/342 |
| 4,406,483 A | * | 9/1983 | Perlman | 285/340 |

(Continued)

OTHER PUBLICATIONS

International Search Report and Written Opinion dated Aug. 16, 2011, as issued in corresponding International Patent Application No. PCT/ZA2011/000020, filed Apr. 7, 2011.

*Primary Examiner* — David E Bochna
(74) *Attorney, Agent, or Firm* — Maier & Maier, PLLC

(57) ABSTRACT

A compression pipe fitting is provided. The fitting comprises a body defining one or more sockets for receiving an end of a pipe, a clamping nut and a grip ring. The socket is encircled by a threaded face, and is internally adapted to receive a compressible O-ring. The nut can be screwed onto the threaded face of the socket and has an internal tapered surface while the grip ring has a complimentally tapered surface which, when the nut is tightened onto the threaded face, bears upon the grip ring compressing it against the pipe and compressing the o-ring located within the socket.

10 Claims, 4 Drawing Sheets

(56) References Cited

U.S. PATENT DOCUMENTS

| | | | |
|---|---|---|---|
| 4,878,697 A * | 11/1989 | Henry | 285/322 |
| 5,351,998 A * | 10/1994 | Behrens et al. | 285/342 |
| 5,370,423 A * | 12/1994 | Guest | 285/322 |
| 5,390,969 A * | 2/1995 | Guest | 285/322 |
| 6,173,999 B1 * | 1/2001 | Guest | 285/340 |
| 6,702,336 B1 * | 3/2004 | Chelchowski et al. | 285/249 |
| 6,824,172 B1 * | 11/2004 | Komolrochanaporn | 285/340 |
| 6,851,728 B2 * | 2/2005 | Minami | 285/342 |
| 6,988,746 B2 * | 1/2006 | Olson | 285/342 |
| 7,032,932 B2 * | 4/2006 | Guest | 285/322 |
| 7,410,174 B2 * | 8/2008 | Jones et al. | 285/339 |
| 7,422,248 B2 * | 9/2008 | Guest | 285/323 |
| 7,425,022 B2 * | 9/2008 | Guest | 285/322 |
| 7,644,955 B1 * | 1/2010 | Komolrochanaporn | 285/340 |
| 8,272,671 B2 * | 9/2012 | Becker et al. | 285/342 |

* cited by examiner

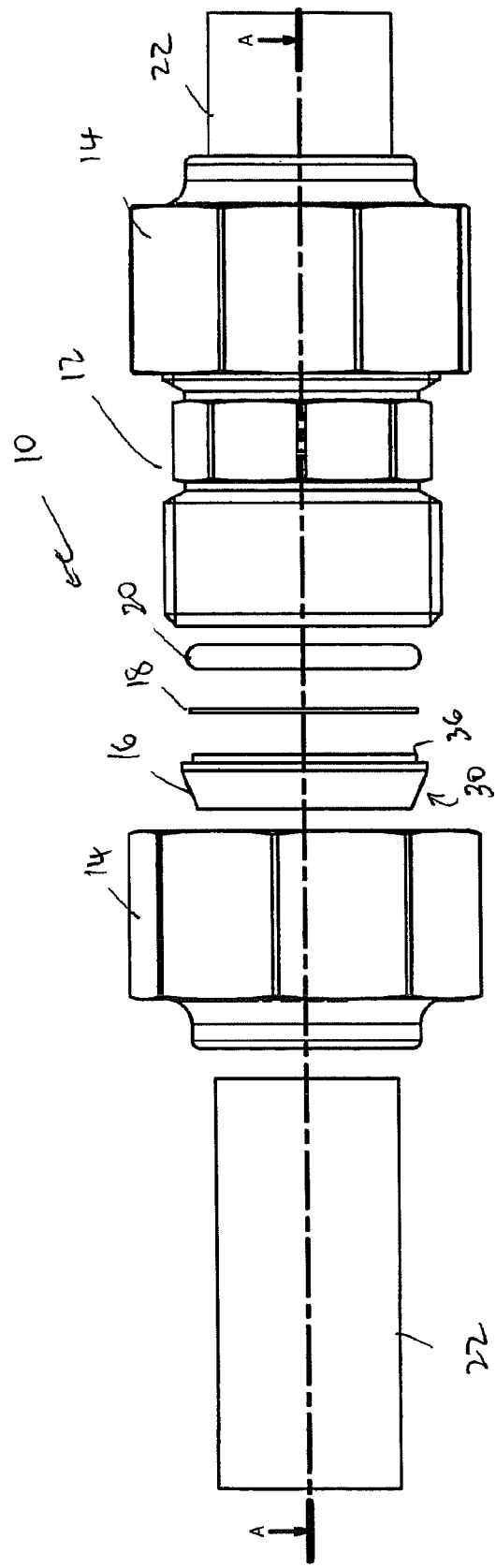
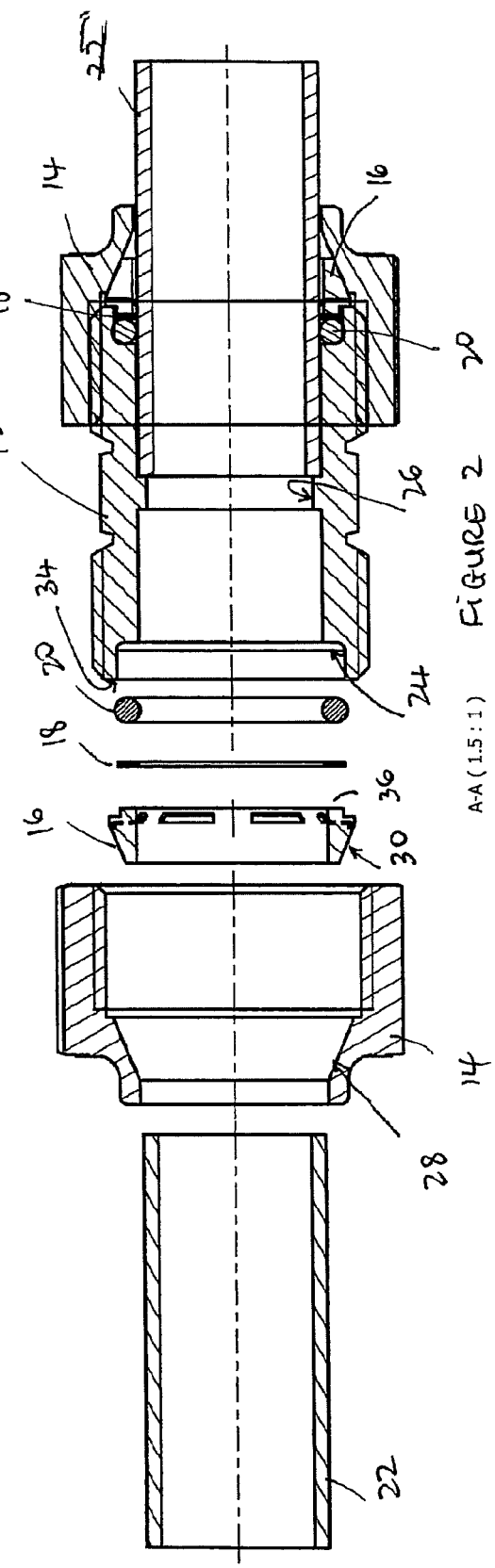
FIGURE 1
FIGURE 2
A-A (1.5:1)

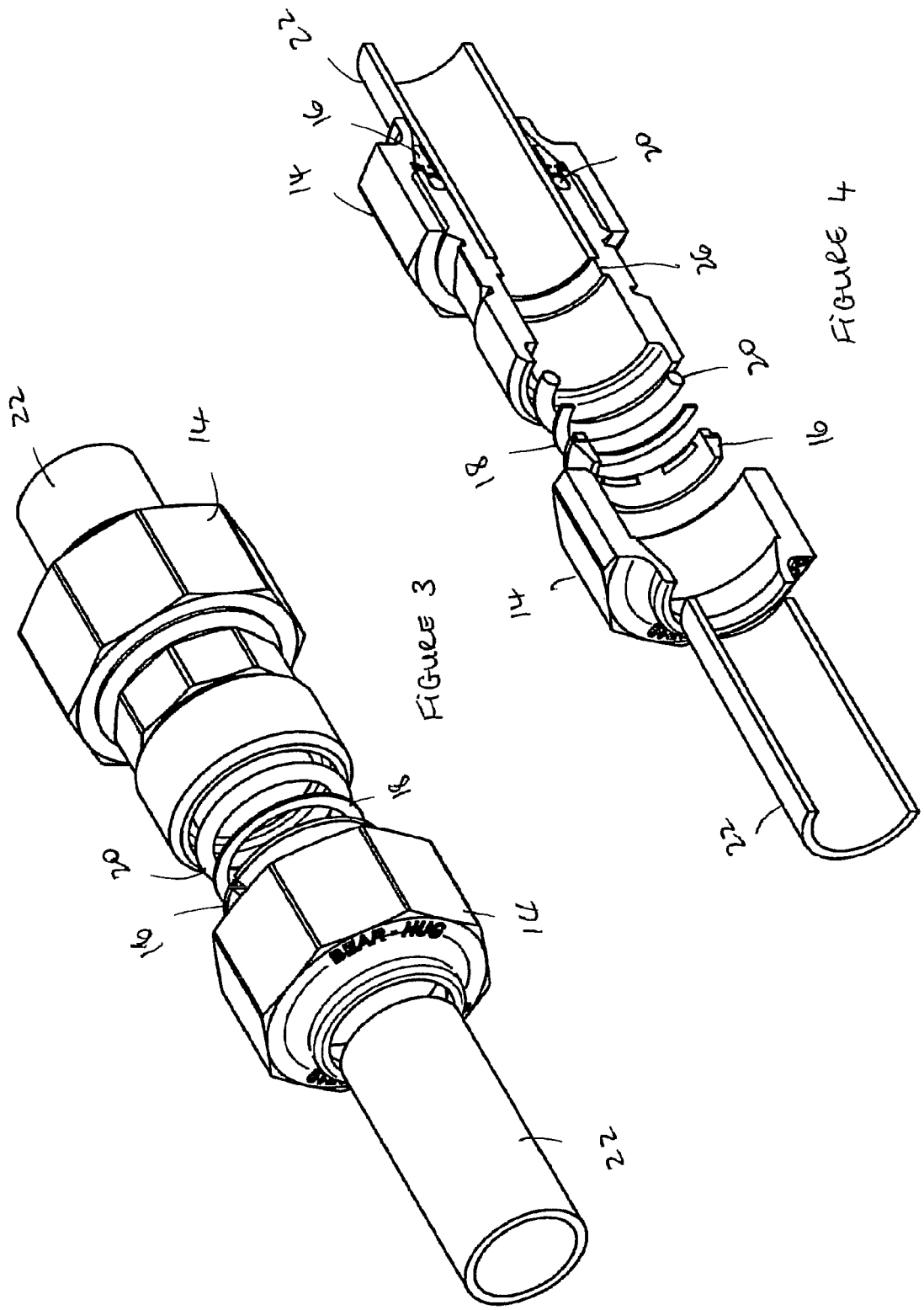

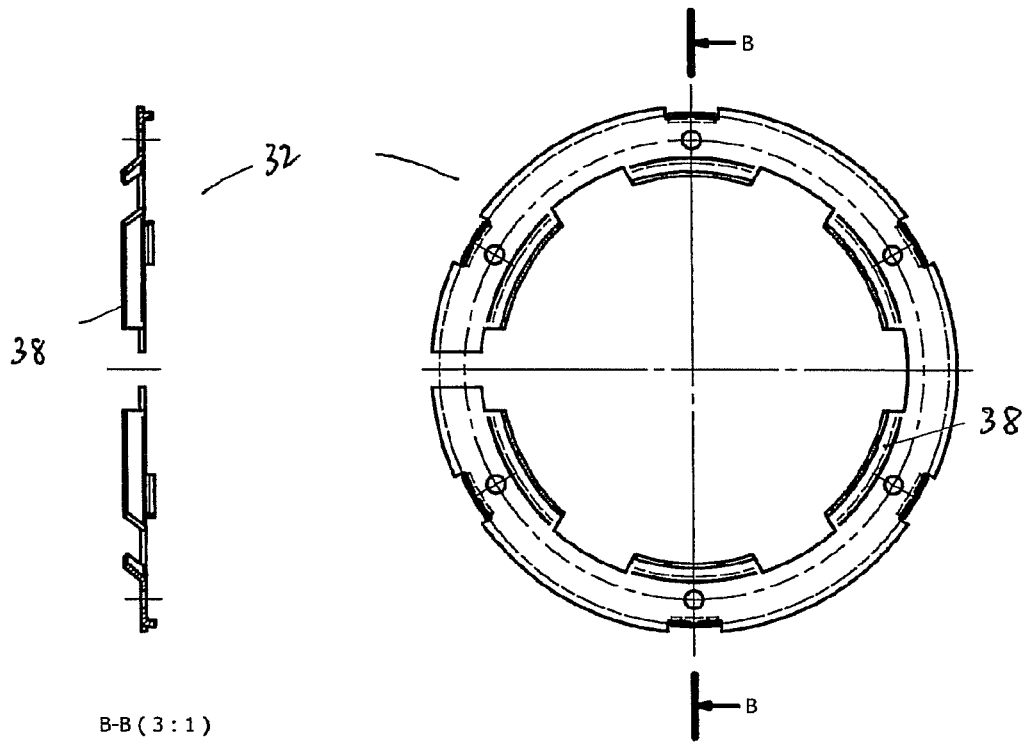
B-B (3:1)
FIGURE 8
FIGURE 9
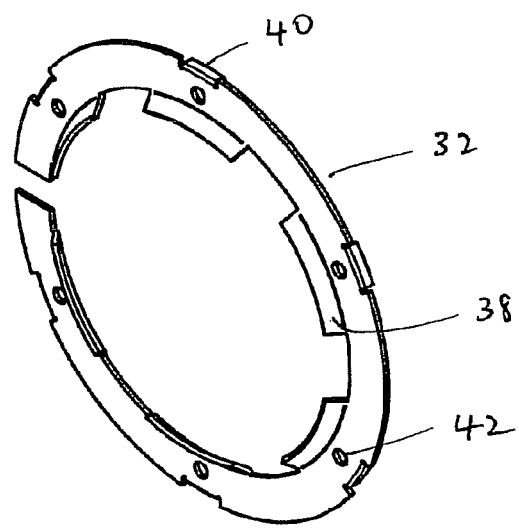
FIGURE 10

PIPE FITTING

RELATED APPLICATIONS

This is the U.S. national stage application which claims priority under 35 U.S.C. §371 to International Patent Application No.: PCT/ZA2011/000020 filed on Jul. 7, 2011, which claims priority to South African Patent Application No. 2010/04923 filed on Jul. 13, 2010, the disclosures of which are incorporated by reference herein their entireties.

TECHNICAL FIELD OF THE INVENTION

This invention relates to a pipe coupling and in particular a push-fit compression fitting.

BACKGROUND ART

Prior art pipe fittings are available which act as either compression fittings or push-fit fittings, but not both.

For example, JP 2001074178 (Bridgestone Corp), which aims to reduce the number of parts constituting a pipe joint, is a push-fit fitting but is not a compression fitting. This fitting includes a grip ring (1) which comprises a cylinder/ring made of resin, with a number of metallic claws or teeth embedded in the ring such that the tips of the teeth protrude to engage the pipe that is fitted. A cap (15) screws onto the pipe body (11) but does not act on the grip ring (1). The cap simply retains the O-ring in place and prevents it from moving under pressure, but does not compress the O-ring and therefore does not act as a compression fitting. This is clear from FIGS. 5, 6 and 7 of the patent.

CN 201237049 (PRIORITY DATE Oct. 7, 2008)

This is a utility model (registered design) for a quick pipe joint for a compressed air pipe. The pipe joint comprises a joint pipe (1) (see drawings) and a press cover (2) detachably connected to the joint pipe by means of a screw thread. A clamp ring base (5) is arranged on the head section of the joint pipe. The inner end of the clamp ring (5) protrudes into the joint pipe. A sealing ring (4) abuts against the clamp ring base (5). The inner ring of the sealing ring protrudes (stands proud) out of the inner diameter of the clamp ring base. A metal elastic clamp ring (6) is arranged at the outer end face of the clamp ring base (5) and includes a ring body and claw teeth folded in the direction of the clamp ring base. A bevel ring is arranged at the opening of the clamp ring base and the claw teeth about the bevel ring. A pusher (7) abuts the outer end of the elastic clamp ring and a boss (on the press cover 2) abuts the other end of the pusher.

In use, the press cover (2) is screwed tightly and the boss on the press cover causes the pusher to drive the elastic clamp ring (6) against the bevel ring, causing the teeth to "expand" and clamp the pipe.

Although the pusher acts against the clamp ring to expand the teeth and clamp the pipe, and therefore allows it to act as a push-fit fitting, it does not engage the O-ring at all. This is clear from FIG. 1 that the clamp ring base 5 engages and abuts against the end of the joint pipe 1 which prevents the clamp ring base acting upon the O-ring 4. Accordingly, and although the O-ring may protrude into the inner diameter of the clamp ring base, it simply acts as a seal and is not compressed about the compressed air pipe. The fitting of CN 201237049 therefore is a push-fit fitting but not a compression fitting or a push-fit compression fitting.

It is an object of this invention to provide a push-fit pipe coupling which has the additional advantage of including a nut which may be tightened thereover to provide additional gripping force and better sealing.

DISCLOSURE OF THE INVENTION

According to the invention, a push-fit compression pipe fitting comprises a body defining one or more socket for receiving an end of a pipe, the socket being encircled by a threaded face; and being internally adapted to receive a compressible O-ring; a clamping nut which can be screwed onto the threaded face, and a grip ring; the nut having an internal tapered surface and the grip ring having a complimentally tapered surface which when the nut is tightened onto the threaded face, bears upon the grip ring compressing it against the pipe and compressing the O-ring sealing means located within the socket against the pipe.

The socket includes a circumferential recess about the mouth thereof which acts as an O-ring seat; and a rear shoulder or flange or step.

The grip ring preferably comprises a split ring which preferably has an internal diameter which is slightly smaller than the external diameter of the inserted pipe, which results in the grip ring expanding slightly when the pipe is inserted therethrough. The grip ring further includes a plurality of small teeth spaced apart about the internal or pipe engaging surface thereof. In the preferred form, the grip ring comprises a stainless steel ring embedded within a plastic composite material. The stainless steel ring includes about its internal diameter, one or more teeth angled inwardly and in the direction of the fitting body when the fitting is assembled.

The underside of the grip ring is dimensioned to engage the mouth of the socket, and may include a ridge or the like protruding formation defining a stepped surface adapted to engage the O-ring, the ridge being spaced apart from the external diameter of the grip ring to fit within the O-ring seat and linearly compress the washer and O-ring, against the O-ring seat, causing the O-ring to be deformed and in so doing tightly engaging the inserted pipe end. The ridge may be eliminated by providing an o-ring having a larger cross sectional diameter.

In the preferred form of the invention, a flat washer may be provided between the O-ring and the grip ring. The washer may be omitted, as described above with the grip ring engaging the O-ring directly, but the fitting has been found to perform better under extreme pressure conditions if the washer is present, as it prevents damage to the O-ring caused by the ends of the split ring under these conditions.

Because the internal diameter of the grip ring is smaller than that of the external diameter of the inserted pipe, the fitting acts as a push-fit compression fitting, expanding the grip ring as it pushes therethrough with the result that full tightening of the clamping nut may not be required. However, when the clamping nut is tightened, there is a force opposing that exerted by the nut on the grip ring, which results in a tight engagement between not only the pipe and grip ring, but especially between the O-ring and the pipe. This is particularly useful where the pipe is scratched or damaged and additional compression is required.

Thus it is the grip-ring which prevents the pipe from being pulled out of the fitting, but it is the O-ring which provides significant compression resulting in a unique push-fit compression fitting.

BRIEF DESCRIPTION OF THE DRAWINGS

The preferred embodiment of the invention is described below with reference to the accompanying drawings in which:

FIG. 1 is a sectional view through a pipe coupling of the invention in operational condition, FIG. 2 is a sectional isometric view through the coupling of FIG. 1, FIG. 3 is sectional view of a coupling pipe removed and clamping nut disengaged, FIG. 4 is the same view as FIG. 3 but with the clamping nut engaged, FIG. 8 is a sectional side view of the stainless steel split ring, FIG. 9 is a plan view of the split ring of FIG. 8, And FIG. 10 is an isometric view from below of the split ring of FIG. 9.

DETAILED DESCRIPTION OF THE PREFERRED EMBODIMENT

Figure 5:
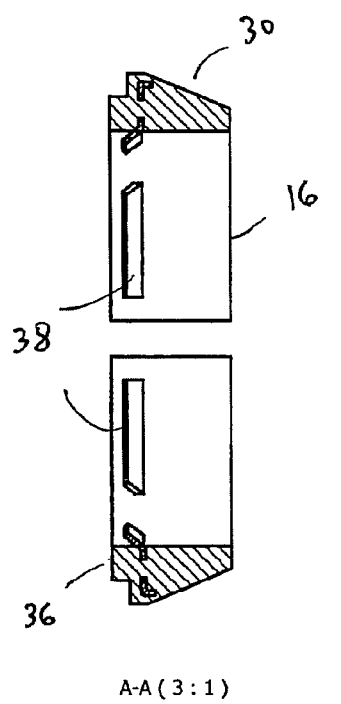
FIG. 5 is a sectional side view of a grip ring.

In FIGS. 1 to 4, a pipe fitting or coupling 10 comprises a body 12, a clamping nut 14, a grip ring 16 and a washer 18 and an O-ring 20.

The body 12 includes a socket at each end for receiving a pipe 22 and the socket includes a widened recess 24 which acts as a seat for the washer 18 and O-ring 20. Externally, the socket is threaded (FIG. 2) to receive the clamping nut 14. Opposing sockets are separated by a flange 26 or step 26.

The clamping nut 14 has an internal tapered surface 28 for engaging and bearing upon the complimentally tapered surface 30 of the grip ring 16.

The washer 18 is flat and comprises metal while the O-ring 20 comprises a resiliently deformable material, for example rubber or silicone rubber.

Figure 6:
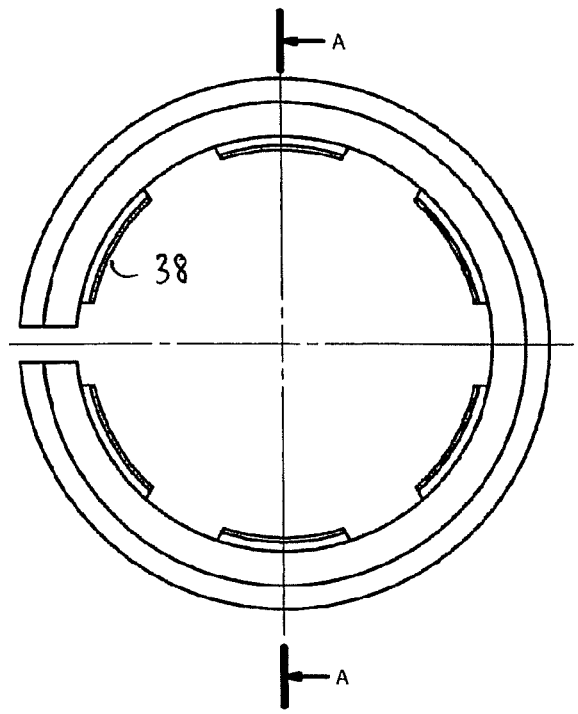
FIG. 6 is a plan view of the grip ring of FIG. 5.
Figure 7:
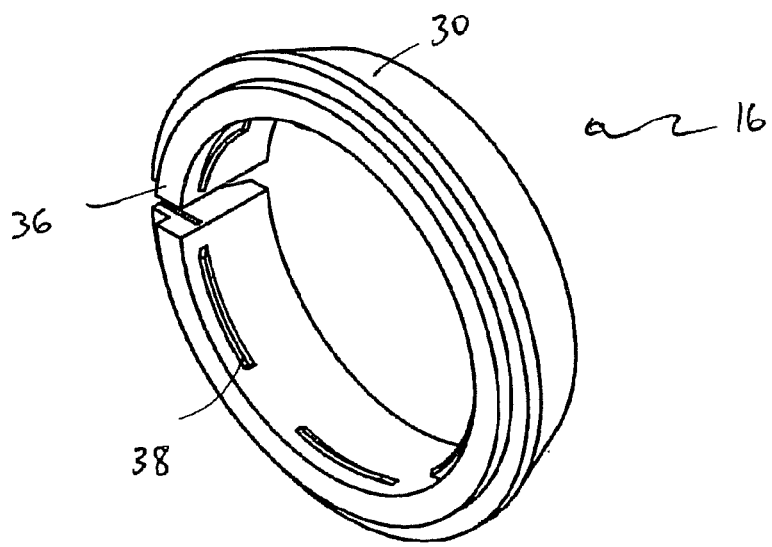
FIG. 7 is an isometric from below of the grip ring.

Turning now to FIGS. 5 through 7, the grip ring 16 is shown to be moulded from plastic and includes embedded therein, a stainless steel split ring 32 as shown in FIGS. 8 to 10. The underside of the grip ring has a diameter sufficiently large to span the mouth of the socket and abut surface 34. The underside of the grip ring is further stepped or ridged 36 at an external diameter dimensioned to fit within the recess or O-ring seat 24. This enables the ridge or step 36 to engage the washer 28 and exert a linear force onto the washer 18 and in turn, the O-ring 20 when the clamping nut 14 is tightened.

The split ring 32 has teeth or the like protrusions 38 about its internal diameter, which are directed inwardly and in the direction of insertion of the pipe. Formations 40 and 42 assist in stabilising the stainless steel ring within the mould during moulding of the grip ring 16.

In use, the fitting of the invention is pre-assembled with the clamping nut partially threaded onto the body, and the grip ring in loose abutment with both the internal tapered surface of the clamping nut and the mouth 34 of the body. A pipe end is then pushed into the fitting, causing expansion of the split grip ring into firm abutment with the tapered surface of the nut and the mouth 34 of the body. This in turn causes linear compression of the O-ring which deforms to tightly engage the pipe (as shown in FIG. 2). If additional compression is required, the nut may be advanced by rotation on the threaded face of the body to apply additional pressure on the grip ring and the O-ring.

The invention claimed is:

1. A push-fit compression pipe fitting comprising a body defining one or more sockets for receiving an end of a pipe, the socket being encircled by a threaded face, and including a seat and a compressible O-ring received within the seat, a clamping nut which can be screwed onto the threaded face, and a grip ring; the internal surface of the nut and the external surface of the grip ring being complementally tapered and engaged in full and complete abutment when the nut is tightened onto the threaded face;
   wherein tightening of the nut results in linear compression of the O-ring between the seat of the socket and the grip ring, consequently reducing the diameter of the O-ring to create a sealing fit around the pipe, wherein the grip ring comprises a stainless steel split ring embedded within a plastic composite material.

2. A push-fit compression pipe fitting as claimed in claim 1, wherein the socket includes a circumferential recess about the mouth thereof which acts as the O-ring seat; and a rear shoulder or flange or step.

3. A push-fit compression pipe fitting as claimed claim 1, wherein the grip ring comprises a split ring which has an internal diameter which is slightly smaller than the external diameter of the inserted pipe, which results in the grip ring expanding slightly when the pipe is inserted therethrough.

4. A push-fit compression pipe fitting as claimed in claim 1, wherein the grip ring includes a plurality of small teeth spaced apart about the internal or pipe engaging surface thereof.

5. A push-fit compression pipe fitting as claimed in claim 1, wherein the stainless steel split ring includes about its internal diameter, one or more teeth angled inwardly and in the direction of the fitting body when the fitting is assembled.

6. A push-fit compression pipe fitting as claimed in claim 1, wherein a rear surface of the grip ring is dimensioned to engage the mouth of the socket.

7. A push-fit compression pipe fitting as claimed in claim 6, wherein the rear surface of the grip ring includes a ridge defining a stepped surface adapted to engage the O-ring.

8. A push-fit compression pipe fitting as claimed in claim 7, wherein the ridge is dimensioned to fit within a circumferential recess of the socket and to linearly compress the O-ring against the O-ring seat, causing the O-ring to be deformed and in so doing tightly engaging the inserted pipe end.

9. A push-fit compression pipe fitting as claimed in claim 7, wherein a flat washer is provided between the O-ring and the grip ring.

10. A push-fit compression pipe fitting as claimed in claim 6, wherein the O-ring has a cross sectional diameter greater than the depth of the O-ring seat.

* * * * *